(12) United States Patent
Qian et al.

(10) Patent No.: US 11,220,108 B2
(45) Date of Patent: Jan. 11, 2022

(54) ONLINE SPITTING

(71) Applicant: Hewlett-Packard Development Company, L.P., Spring, TX (US)

(72) Inventors: Li Qian, Sant Cugat del Valles (ES); Eduardo Amela Conesa, Sant Cugat del Valles (ES); Marian Dinares Argemi, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/050,469

(22) PCT Filed: Jun. 19, 2018

(86) PCT No.: PCT/US2018/038324
§ 371 (c)(1),
(2) Date: Oct. 26, 2020

(87) PCT Pub. No.: WO2019/245537
PCT Pub. Date: Dec. 26, 2019

(65) Prior Publication Data
US 2021/0146688 A1    May 20, 2021

(51) Int. Cl.
*B41J 2/165* (2006.01)

(52) U.S. Cl.
CPC .... *B41J 2/16526* (2013.01); *B41J 2002/1657* (2013.01); *B41J 2002/16573* (2013.01); *B41J 2002/16576* (2013.01)

(58) Field of Classification Search
CPC ............ B41J 2/16526; B41J 2002/1657; B41J 2002/16573
See application file for complete search history.

(56) References Cited

U.S. PATENT DOCUMENTS

| 6,158,835 A | 12/2000 | Jackson et al. |
| 6,179,403 B1 | 1/2001 | Xie et al. |
| 6,601,935 B2 | 8/2003 | Vega et al. |
| 7,293,861 B2 | 11/2007 | Silverbrook |
| 7,850,271 B2 | 12/2010 | Gothait et al. |
| 8,136,917 B2 | 3/2012 | Sakurai |

(Continued)

FOREIGN PATENT DOCUMENTS

WO    2016018277    2/2016

*Primary Examiner* — Julian D Huffman
(74) *Attorney, Agent, or Firm* — HP Inc. Patent Department

(57) ABSTRACT

An example of a printing apparatus comprising a scanning printhead and a controller is disclosed. The scanning printhead comprises a plurality of nozzles to print using a mask comprising a ramp area and non-ramp area. A first subset of nozzles of the plurality of nozzles is assigned to the ramp area and the second subset of nozzles of the plurality of nozzles is assigned to the non-ramp area. The controller is to calculate a number of spits of a nozzle from the second subset of nozzles for a pass. The controller is also to calculate a number of spits of a nozzle from the first subset of nozzles for the pass based on the number of spits of the nozzle from the second subset of nozzles. The controller is further to instruct the nozzle from the first subset of nozzles to eject online an amount of a composition on a service zone based on the number of spits of the first subset of nozzles.

15 Claims, 7 Drawing Sheets

(56) References Cited

U.S. PATENT DOCUMENTS

| | | |
|---|---|---|
| 9,211,699 B2 | 12/2015 | Rossell et al. |
| 2003/0063153 A1 | 4/2003 | Bauer |
| 2003/0081024 A1 | 5/2003 | Vives et al. |
| 2005/0134922 A1 | 6/2005 | Walmsley |
| 2006/0066655 A1 | 3/2006 | Richard |
| 2010/0277530 A1 | 11/2010 | Bastani |
| 2012/0206523 A1* | 8/2012 | Hirosawa ............. B41J 2/16585 347/12 |
| 2014/0152730 A1* | 6/2014 | Sato ..................... B41J 2/16526 347/14 |
| 2015/0258779 A1 | 9/2015 | Ito |
| 2015/0314594 A1* | 11/2015 | Ukeji ................... B41J 2/04596 347/9 |
| 2017/0210125 A1* | 7/2017 | Garcia Alvarez .... B41J 2/04536 |
| 2018/0001644 A1* | 1/2018 | Hirosawa ............. B41J 2/16538 |

* cited by examiner

ONLINE SPITTING

BACKGROUND

Inkjet printers are systems that create a printed image by propelling printing fluid through nozzles to substrate pixels. The printing fluid drops may have printing fluid pigments and are stored in a printing fluid repository. The accuracy in which the printing fluid drops are placed in the substrate pixels may lead to a better print job quality or image quality (IQ).

BRIEF DESCRIPTION OF THE DRAWINGS

The present application may be more fully appreciated in connection with the following detailed description taken in conjunction with the accompanying drawings, in which like reference characters refer to like parts throughout and in which:

FIG. 23 is a block diagram illustrating an example of another position of a scanning printhead.

FIG. 33 is a block diagram illustrating an example of a first subset of nozzles and a second subset of nozzles in printhead configurations.

DETAILED DESCRIPTION

Figure 1:
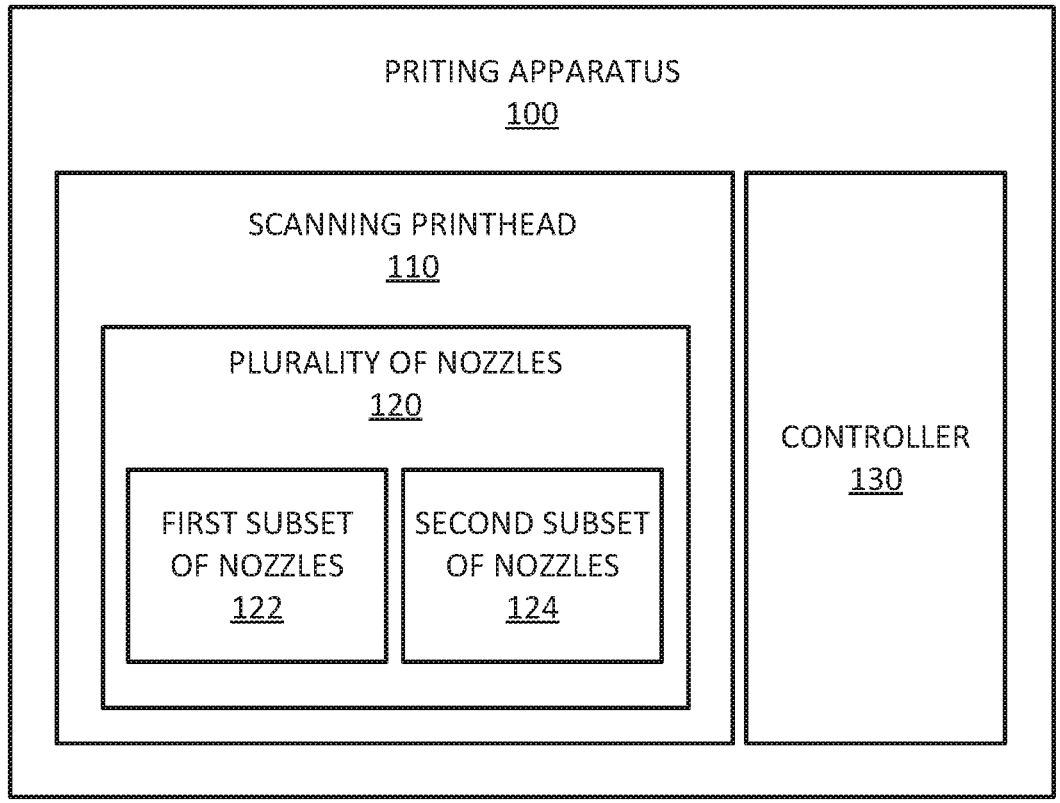
FIG. 1 is a block diagram illustrating an example of a printing apparatus to perform online spitting.

The following description is directed to various examples of the disclosure. In the foregoing description, numerous details are set forth to provide a thorough understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As mentioned above, inkjet printers are systems that create a printed image by propelling printing fluid through nozzles to substrate pixels. The printing fluid drops may have printing fluid pigments and are stored in a printing fluid repository. The accuracy in which the printing fluid drops are placed in the substrate pixels may lead to a better print job quality or image quality (IQ). Precisely, printers may use printing masks to select which nozzles from a printhead should eject printing fluid on each pixel from the substrate.

In some examples, printing systems comprise at least one scanning printhead that is to move across the width of the substrate ejecting printing fluid. Depending on the printing mask (e.g., round print mask), each nozzle from the printhead does not degrade equally therefore leading the printhead to be an array of nozzles wherein some nozzles are more degraded than others. These differentiations of nozzle degradation may lead to substantial biases in the printing (e.g., banding) therefore reducing the IQ of the printing job.

In the present disclosure reference is made to a printing apparatus. The term "printing apparatus" should be understood in its broad definition, therefore being any image recording system that uses at least one printhead. In an example, the printing system may be a two-dimensional (2D) desk printer. In another example, the printing system may be a 2D large format printer. In another example, the printing system may be a printing press. In yet another example, the printing system may be a three-dimensional (3D) printer and/or an additive manufacturing system.

An example of the present disclosure provides a printing apparatus comprising a scanning printhead and a controller. The scanning printhead comprises a plurality of nozzles to print using a mask comprising a ramp area and non-ramp area. A first subset of nozzles of the plurality of nozzles is assigned to the ramp area and the second subset of nozzles of the plurality of nozzles is assigned to the non-ramp area. The controller is to calculate a number of spits of a nozzle from the second subset of nozzles for a pass. The controller is also to calculate a number of spits of a nozzle from the first subset of nozzles for the pass based on the number of spits of the nozzle from the second subset of nozzles. The controller is further to instruct the nozzle from the first subset of nozzles to eject online an amount of a composition on a service zone based on the number of spits of the first subset of nozzles.

Another example of the present disclosure provides a method comprising a plurality of operations to be performed. The method comprises (i) calculating a number of spits for a pass of a nozzle from a second subset of nozzles, wherein the second subset of nozzles is assigned to print in a non-ramp area from a mask. The method also comprises (ii) calculating a number of spits for the pass of a nozzle from a first subset of nozzles based on the number of spits of the nozzle from the second subset of nozzles, wherein the first subset of nozzles is assigned to print in a ramp area from the mask. The method further comprises (iii) instructing the nozzle from the first subset of nozzles to eject online an amount of a composition on a service zone based on the number of online spits of the first subset of nozzles.

Another example of the present disclosure provides a non-transitory machine-readable medium storing instructions executable by a processor. The non-transitory machine-readable medium comprises (i) instructions to calculate a number of spits for a pass of a nozzle from a second subset of nozzles wherein the second subset of nozzles is assigned to print in a non-ramp area from a mask. The non-transitory machine-readable medium also comprises (ii) instructions to calculate a number of spits for the pass of a nozzle from a first subset of nozzles based on the number of spits of the nozzle from the second subset of nozzles, wherein the first subset of nozzles is assigned to print in a ramp area from the mask. The non-transitory machine-readable medium further comprises (iii) instructions to instruct the nozzle from the first subset of nozzles to eject online an amount of a composition on a service zone based on the number of online spits of the first subset of nozzles.

Referring now to the drawings, FIG. 1 is a block diagram illustrating an example of a printing apparatus 100 to perform online spitting. The printing apparatus 100 may comprise a scanning printhead 110. The scanning printhead 110 comprises a plurality of nozzles in at least one of the sides of the scanning printhead 110. In the present disclosure, the term "nozzle" should be interpreted as any cylindrical or round spot at the end of a pipe hose, or tube used to control a jet of a printing composition. In an example, when the scanning printhead 110 is installed in the printing apparatus 100, the side from the scanning printhead 110 that comprises the plurality of nozzles 120 may be facing towards a printing area and/or substrate (see, e.g., printing area 220A, 220B, and/or 220C from FIG. 2A, 2B, an/or 2C respectively). In an example, the printing apparatus 100 may be fed by a substrate to be printed thereon, therefore the substrate being external to the printing apparatus 100. In another example, the printing apparatus 100 may comprise a substrate repository therein to store the substrate. In an example, the scanning printhead 110 may comprise a scanning mechanism to move the scanning printhead 110 across the width of the substrate to be printed thereon. A wide variety of substrates to be printed thereon may be used. In an example, a paper-based substrate may be used. Other examples may use different types of substrates, such as a fabric substrate, a polymeric substrate, wood substrate, and/or an additive manufacturing build material substrate. These are examples of substrates; however other substrates may be used without departing from the scope of the present disclosure. The printing apparatus 100 may further comprise a controller 130 connected to the plurality of nozzles 120. The controller connection may be by means of a physical wire and/or wireless. The term "controller" as used herein may include a series of instructions encoded on a machine-readable storage medium and executable by a single processor or a plurality of processors. Additionally, or alternatively, a controller may include at least one hardware device including electronic circuitry, for example a digital and/or analog application-specific integrated circuit (ASIC), for implementing the functionality described herein.

As mentioned above, the plurality of nozzles is to eject a composition. In an example, the composition may comprise a colorant with a liquid carrier (e.g., cartridges and/or toner ink commercially available from HP Inc.). In another example, the composition may comprise ink particles and an imaging oil liquid carrier (e.g., liquid toner ink commercially known as HP ElectroInk from HP Inc.). In another example, the composition is an additive manufacturing fusing agent which may be an ink-type formulation comprising carbon black, such as, for example, the fusing agent formulation commercially known as V1Q60Q "HP fusing agent" available from HP Inc. In an additional example such a fusing agent may additionally comprise an infra-red light absorber. In another additional example such a fusing agent may additionally comprise a near infra-red light absorber. In another additional example, such a fusing agent may additionally comprise a visible light absorber. In yet another additional example such fusing agent may additionally comprise a UV light absorber. Examples of inks comprising visible light enhancers are dye-based colored ink and pigment-based colored ink (e.g., inks commercially known as CE039A and CE042A available from HP Inc.). In yet another example, the composition may be a suitable additive manufacturing detailing agent (e.g., a formulation commercially known as V1Q61A "HP detailing agent" available from HP Inc.). A plurality of examples of the composition that may be ejected by the plurality of nozzles 120 have been disclosed, however other similar compositions may be used without departing from the scope of the present disclosure.

As mentioned above, the scanning printhead 110 comprises a plurality of nozzles 120. The plurality of nozzles 120 comprises a first subset of nozzles 122 and a second subset of nozzles 124. The plurality of nozzles 120 may be to print using a mask comprising a ramp area and a non-ramp area. The first subset of nozzles 122 is assigned to the ramp area and the second subset of nozzles 124 is assigned to the non-ramp area. The non-ramp area from the mask is intended to comprise the nozzles from the plurality of nozzles 120 that equally degrades due to the printing operation. The ramp area from the mask is intended to comprise the nozzles from the plurality of nozzles 120 that non-equally degrades due to the characteristics of the mask. In an example, a round mask in a large format printer does not degrade equally the nozzles at the edges of the printhead since said edge nozzles eject a lesser amount of the composition due to, for example, spending more time over the service zone than the central nozzles from the printhead. Detailed examples of the mask may be found in FIGS. 3A and 4A in conjunction with FIGS. 3B and 4B respectively.

The controller 130 is to calculate a number of spits of a nozzle from the second subset of nozzles 124 for a pass. The term "pass" may be interpreted as the operation in which the scanning printhead 110 moves from an edge of the width of the substrate to the opposite edge. In an example, during the "pass" operation a nozzle from the plurality of nozzles 120 may eject an amount of the composition therethrough. In another example, during the "pass" operation any nozzle from the plurality of nozzles 120 may eject the composition. There may be a plurality of approaches towards calculating the number of spits of a nozzle from the second subset of nozzles 124. For example, the controller 130 may calculate the number of spits of the nozzle from the second subset of nozzles 124 based on the fire frequency of said nozzle. The fire frequency of a nozzle may be based on the selected print mode.

A print mode configuration may be understood as the selection of the values of the parameters and/or features that may have an effect in a printing operation. In an example, the print mode may comprise at least one parameter of the group defined by ink efficiency, number of passes, printhead or carriage speed, drop volume, ink density, printhead nozzle resolution, color set, average fire frequency per color, or a combination thereof. The ink efficiency may be defined as the mass of the composition to be set per surface unit, for example, about 10 grams per square meter (g/sqm). The number of passes may be used in, for example, large format printers that comprise a carriage with a plurality of printheads therein, in which different subsets of the printheads from the carriage may print different passes, for example, four or six passes. The carriage speed may be defined as the speed of the scanning printhead 110 from an edge of the width of the substrate to the opposite edge, for example, about 40 inches per second (ips). The drop volume may be defined as the volume of each drop of the composition in a spit, for example, about 12 picolitres (pl). The ink density may be defined as the mass of the composition in a unity of volume, for example, about 1 gram per cubic centimeter (g/cc). The printhead nozzle resolution may be defined as the number of dots of the composition in a unit of surface, for example, about 1200 dots per inch (dpi). The color set may be defined as the color compositions ejected by the plurality of nozzles 120 that allow to print in a wide color gamut and add further properties to the print job, for example at least one of the group comprising: cyan composition, magenta composition, yellow composition, black composition, light cyan composition, light magenta composition, white composition, gray composition, fluorescent compositions, other non-marking fluids such as an optimizer, anti-scratch coating, additive manufacturing fusing agents, additive manufacturing detailing agents, Electroink, or a combination thereof. An example of all of the previous compositions may be available from HP Inc. The average fire frequency per color may be defined as the amount of spits from a nozzle per unit of time, for example, about 512 Hertz (Hz).

As used herein, the term "about" and/or "substantially" is used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

The controller 130 may calculate a number of spits of a nozzle from the first subset of nozzles 122 for the pass based on the number of spits of the nozzle from the second subset of nozzles 124. In an example, each of the nozzles from the first subset of nozzles 122 do not degrade uniformly since the nozzles located in a closer position to the edge of the scanning printhead 110 may eject less composition spits than the nozzles located in a closer position to the nozzles from the second subset of nozzles 124, therefore leading to a lower degradation of said nozzles. In an example, the controller may calculate the number of spits of a nozzle from the first subset of nozzles 122 by using a probabilistic linear approach. In the probabilistic linear approach the nozzle from the first subset of nozzles 122 located at the closest position to the edge of the scanning printhead 110 may be identified as a nozzle that does not spit, and the nozzle from the first subset of nozzles 122 located at the closest position to a nozzle from the second subset of nozzles 124 may be identified as a nozzle that spits as a nozzle from the second subset of nozzles 124. The number of spits of a nozzle in between the edge nozzles (i.e., the nozzle closest to the edge of the scanning printhead 110 and the nozzle closest to the nozzle from the second subset of nozzles 124), are calculated by interpolating the number of spits of said edge nozzles with the distance from the nozzle to the non-ramp area. A probabilistic linear approach has been disclosed, however many other approaches may be used without departing from the scope of the present disclosure, such as, normal distribution, second grade distribution, third grade distribution, and the like.

The controller 130 may instruct the nozzle from the first subset of nozzles 122 to eject online an amount of a composition on a service zone based on the number of spits of the first subset of nozzles 122. In the present disclosure, the term "online" should be interpreted as during the printing operation. For example, the first subset of nozzles 122 may eject the amount of the composition in the service zone between a pass and the following pass, therefore not delaying the print job completion. The service zone (see, e.g., service zone 230A, 230B, and/or 230C from FIGS. 2A, 3B, and/or 2C respectively) may be a zone other than the printing zone (e.g., printing zone 220A, 220B, and/or 220C from FIG. 2A, 2B, 2C respectively). There may not be substrate in the service zone. The controller 130 may instruct the nozzle from the first subset of nozzles 122 to eject online the amount of a composition that may degrade said nozzle from the first subset of nozzles 122 to about the level of degradation of any nozzle from the second subset of nozzles 124. The amount ejected online in the service zone by the nozzle from the first subset of nozzles 122 may be the difference between (i) the number of spits of a nozzle from the second subset of nozzles 124 for a pass and (ii) the number of spits of said nozzle from the first subset of nozzles 122.

Some of the instructions of the controller 130 have been disclosed. However, the controller 130 may comprise additional instructions. The number of spits that a nozzle from the first subset of nozzles 122 may spit online on a service zone may be limited by an online spitting threshold. The online spitting threshold may determine the maximum amount of spits per nozzle that may be ejected online in a service zone without delaying the print job operation completion. The online spitting threshold may be determined by a plurality of variables, for example at least one of: the ramp area width, the speed of the scanning printhead 110, the fire frequency of the nozzles, the service zone width, or a combination thereof.

The controller 130 may determine whether the number of spits of the nozzle from the first subset of nozzles 122 exceeds the online spitting threshold. If the number of spits of the nozzle from the first subset of nozzles 122 exceeds the online spitting threshold, the controller 130 is to instruct the nozzle from the first subset of nozzles 122 to eject online, for example, an amount of the composition on the service zone corresponding to the online spitting threshold, which is the maximum amount that may be spit online in the service zone without delaying the print job completion.

The controller 130 may further calculate a number of offline spits of the nozzle from the first subset of nozzles 122 for the pass to be printed based on (i) the number of spits of the nozzle from the second subset of nozzles 124, and (ii) the online spitting threshold. In the present disclosure, the term "offline" may be interpreted as when the printing apparatus 100 is not performing any printing operation, as opposed to the term "online" defined before. In an example, the controller 130 may calculate the number of offline spits of the nozzle from the first subset of nozzles 122 as about the difference between the number of spits of the nozzle from the second subset of nozzles 124 and the online spitting threshold.

The controller 130 may instruct the nozzle from the first subset of nozzles 122 to eject offline the amount of the composition on the service zone based on the number of offline spits of the nozzle from the first subset of nozzles 122. In an example, the controller 130 may instruct the nozzle from the first subset of nozzles 122 to eject said amount of the composition in the interim period in between a pass and its subsequent pass. In another example the controller 130 may calculate an accumulated number of offline spits of the nozzle from the first subset of nozzles 122 for substantially the totality of the print job. In the example the controller 130 may further instruct the nozzle from the first subset of nozzles 122 to eject offline and, before starting the print job and/or after the completion of the print job, the amount of the composition on the service zone based on the accumulated number of offline spits of the nozzle from the first subset of nozzles 122. The example may delay the equally degradation of the plurality of nozzles 120 from the scanning printhead 110 in virtue of not delaying the completion of the print job. In yet the same or in a different example, the controller 130 may instruct the nozzle from the first subset of nozzles 122 to eject the offline amount of the composition during media loading.

For simplicity, a plurality of examples of online spitting have been disclosed for a single nozzle from the first subset of nozzles 122, and for a single nozzle for the second subset of nozzles 124. However, same operations may be applied to a greater quantity of nozzles from the first subset of nozzles 122, and/or a greater quantity of nozzles from the second subset of nozzles 124; without departing from the scope of the present disclosure.

The examples defined above relate to a single printing pass of the print job, however same operations may be applied to any subsequent pass up to the completion of the print job without departing from the scope of the present disclosure.

Figure 2A:
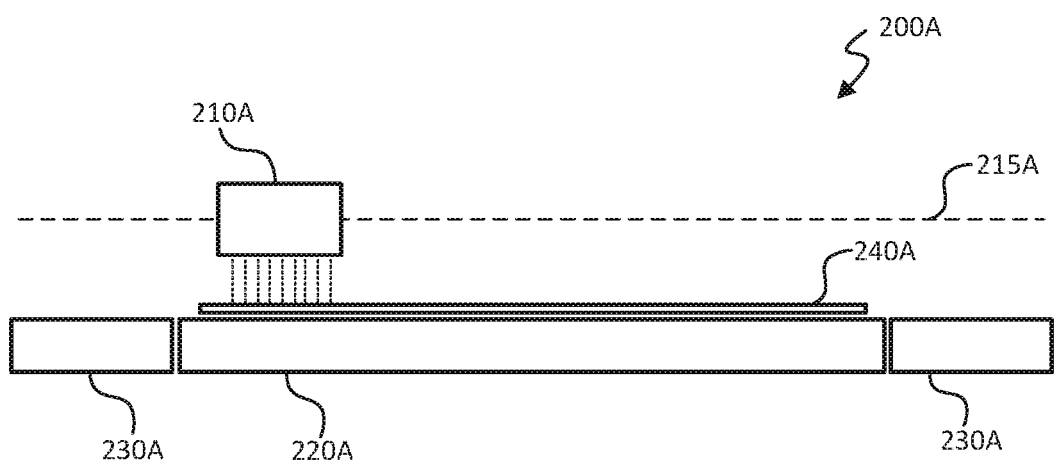
FIG. 2A is a block diagram illustrating an example of a position of a scanning printhead.
Figure 2B:
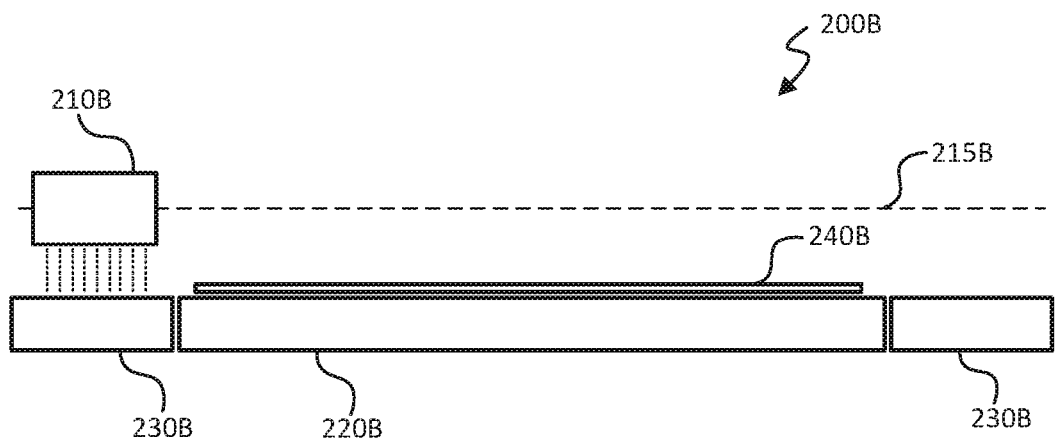
FIG. 2C is a block diagram illustrating an example of another position of a scanning printhead.
Figure 2C:
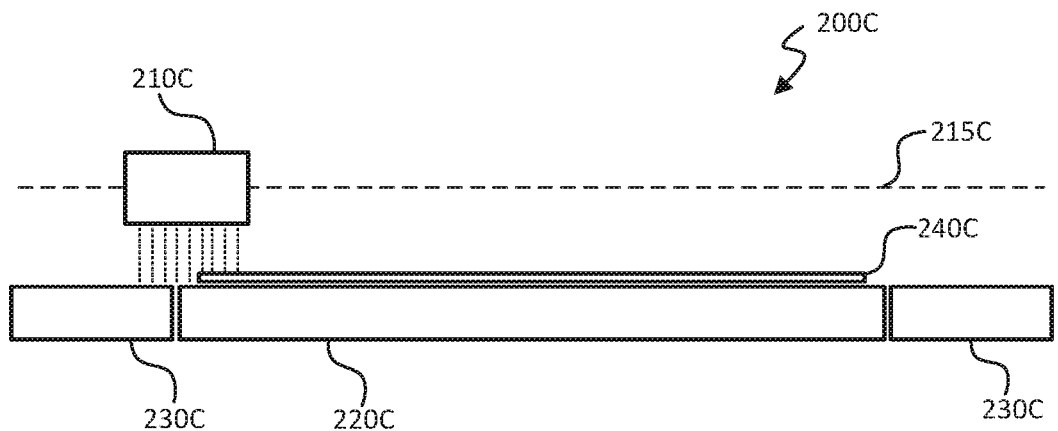

FIG. 2A-2C are block diagrams illustrating examples of different positions of a scanning printhead (e.g., scanning printhead 110 of FIG. 1). FIG. 2A is a block diagram illustrating an example of a position of a scanning printhead 210A through the printing apparatus 200A. The printing apparatus 200A may be similar than the printing apparatus 100 from FIG. 1. The printing apparatus 200A may comprise a scanning printhead 210A and a scanning mechanism 215A. The scanning printhead 210A may be the same as or similar to the scanning printhead 110 of FIG. 1. The printing apparatus 200A may further comprise a printing zone 220A to hold a substrate 240A. A plurality of nozzles from the scanning printhead 210A (e.g., plurality of nozzles 120 of FIG. 1) may eject a composition on the substrate 240A to perform a print job in a pass-by-pass manner. The scanning mechanism 215A may be any mechanism capable of moving the scanning printhead 210A from a first service zone 230A located at a first edge of the printing zone 220A, to a second service zone 230A located at a second edge of the printing zone 220A (i.e., moving the scanning printhead 210A to perform each of the passes). In an example, the printing apparatus 200A may further comprise at least one service zone 230A at an edge of the printing zone 220A. In another example, the printing apparatus 200A may comprise a service zone 220A located at each side of the edge of the width of the substrate 240A. A service zone 220A may be interpreted as any area from the printing apparatus 100 other than the printing zone 220A. The printing apparatus 200A may further comprise a controller (not shown) that may perform similar operations as the controller 130 from FIG. 1.

In the example illustrated herein, a group of the plurality of nozzles from the scanning printhead 210A are spitting the composition to the substrate to print a pass of the print job.

FIG. 2B is a block diagram illustrating an example of a position of a scanning printhead 210B through the printing apparatus 200B. The printing apparatus 200B may be similar than the printing apparatus 100 from FIG. 1 and/or the printing apparatus 200A from FIG. 2A. The printing apparatus 200B may comprise a scanning printhead 210B and a scanning mechanism 215B. The scanning printhead 210B may be the same as or similar to the scanning printhead 110 of FIG. 1. The printing apparatus 200B may further comprise a printing zone 220B to hold a substrate 240B. A plurality of nozzles from the scanning printhead 210B (e.g., plurality of nozzles 120 of FIG. 1) may eject a composition on the substrate 240B to perform a print job in a pass-by-pass manner. The scanning mechanism 215B may be any mechanism capable of moving the scanning printhead 210B from a first service zone 230B located at a first edge of the printing zone 220B, to a second service zone 230E located at a second edge of the printing zone 220B (i.e., moving the scanning printhead 210B to perform each of the passes). In an example, the printing apparatus 200E may further comprise at least one service zone 230B at an edge of the printing zone 220B. In another example, the printing apparatus 200B may comprise a service zone 220B located at each side of the edge of the width of the substrate 240B. A service zone 220B may be interpreted as any area from the printing apparatus 100 other than the printing zone 220B. The printing apparatus 200B may further comprise a controller (not shown) that may perform similar operations as the controller 130 from FIG. 1.

In the example illustrated herein, a group of the plurality of nozzles from the scanning printhead 210E are spitting the composition on the service zone 230B. In an example, the illustrated may be the configuration of the printing apparatus 200B wherein a subset of nozzles (e.g., first subset of nozzles of FIG. 1) are ejecting online an amount of the composition on the service zone 230B based on the number of spits of said subset of nozzles to, for example, degrade the nozzles assigned to a ramp area. In another example, the illustrated may be a configuration of the printing apparatus 200B wherein a subset of nozzles (e.g., first subset of nozzles of FIG. 1) are ejecting offline an amount of the composition on the service zone 230B based on either (i) the number of offline spits, or (ii) the accumulated number of offline spits, of said subset of nozzles to, for example, degrade the nozzles assigned to a ramp area.

FIG. 2C is a block diagram illustrating an example of a position of a scanning printhead 210C through the printing apparatus 200C. The printing apparatus 200C may be similar than the printing apparatus 100 from FIG. 1 and/or the printing apparatuses 200A, and/or 200B from FIGS. 2A, and/or 2B. The printing apparatus 200C may comprise a scanning printhead 210C and a scanning mechanism 215C. The scanning printhead 210C may be the same as or similar to the scanning printhead 110 of FIG. 1. The printing apparatus 200C may further comprise a printing zone 220C to hold a substrate 240C. A plurality of nozzles from the scanning printhead 210C (e.g., plurality of nozzles 120 of FIG. 1) may eject a composition on the substrate 240C to perform a print job in a pass-by-pass manner. The scanning mechanism 215C may be any mechanism capable of moving the scanning printhead 210C from a first service zone 230C located at a first edge of the printing zone 220C, to a second service zone 230C located at a second edge of the printing zone 220C (i.e., moving the scanning printhead 210C to perform each of the passes). In an example, the printing apparatus 200C may further comprise at least one service zone 230C at an edge of the printing zone 220C. In another example, the printing apparatus 200C may comprise a service zone 220C located at each side of the edge of the width of the substrate 240C. A service zone 220C may be interpreted as any area from the printing apparatus 100 other than the printing zone 220C. The printing apparatus 200C may further comprise a controller (not shown) that may perform similar operations as the controller 130 from FIG. 1.

In the example illustrated herein, (i) a first group of the plurality of nozzles from the scanning printhead 210C are spitting the composition to the substrate to print a pass of the print job, and (ii) a second group of the plurality of nozzles from the scanning printhead 210C are spitting the composition on the service zone 230C. In the example, the illustrated may be the configuration of the printing apparatus 200B wherein the second group of nozzles (e.g., first subset of nozzles of FIG. 1) are ejecting online an amount of the composition on the service zone 230C based on the number of spits of said subset of nozzles to, for example, degrade the nozzles assigned to a ramp area.

Figure 3A:
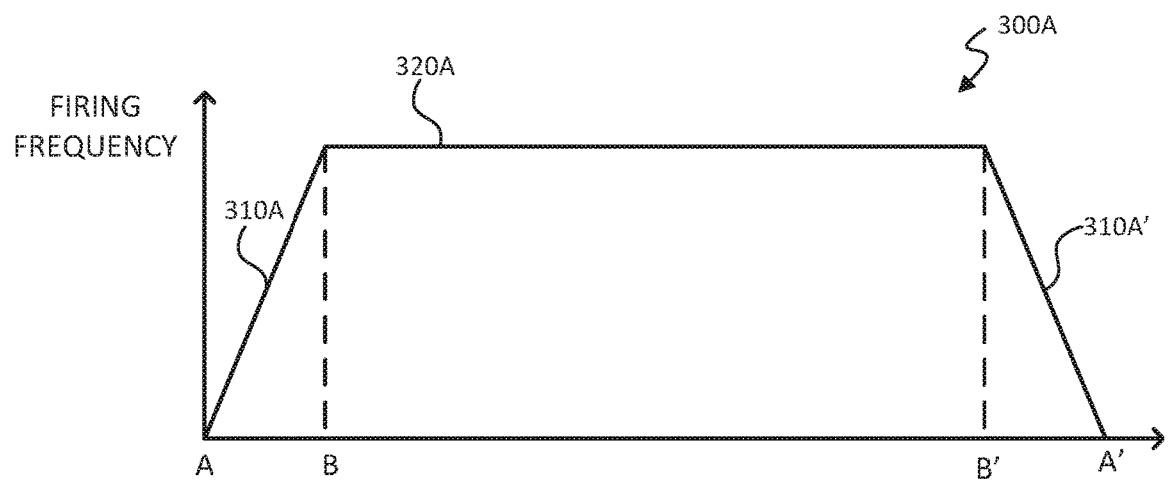
FIG. 3A is a schematic diagram illustrating an example of a mask from a print mode.

FIG. 3A is a schematic diagram illustrating an example of a mask 300A from a print mode. The mask 300A outline is defined by the selected print mode. The controller (e.g., controller 130 from FIG. 1) may adjust the ramp area width from the mask 300A based on a selected print mode. The mask 300A is illustrated as a graph wherein (i) the horizontal axis represents the plurality of nozzles (e.g., plurality of nozzles 120 from FIG. 1) located through the length of a scanning printhead (e.g., scanning printhead 110 from FIG. 1); and (ii) the vertical axis represents the firing frequency. The mask 300A comprises a first ramp area 310A from illustrated point A to illustrated point B. The mask 300A further comprises a non-ramp area 320A from illustrated point B to illustrated point B'. The mask 300A also comprises a second ramp area 310A' from point B' to point A'. The non-ramp area 320A comprises an equal or higher firing frequency than any point from the ramp areas 310A-310A', therefore the corresponding assigned plurality of nozzles from the ramp area 320A (e.g., second subset 124 from FIG. 1) degrade more than the corresponding assigned plurality of nozzles from the non-ramp area 310A (e.g., first subset 122 from FIG. 1).

Figure 3B:
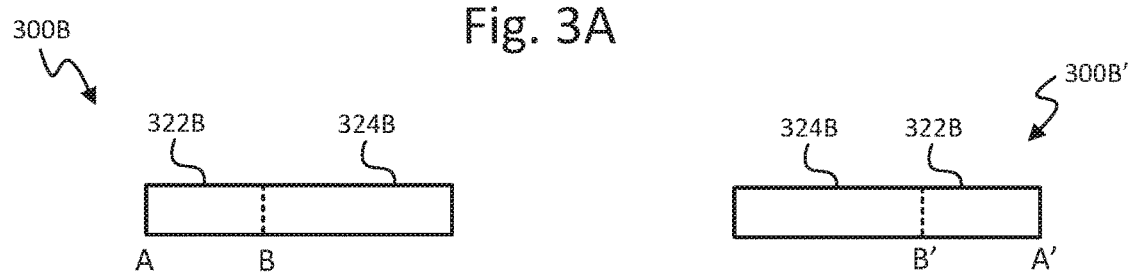

FIG. 3B is a block diagram illustrating an example of a first subset of nozzles and a second subset of nozzles in printhead configurations. FIG. 3B comprises a first scanning printhead 300B located in a first edge of the width of a substrate, and a second scanning printhead 300B' located in a second edge. In an example, the first scanning printhead 300B and the second scanning printhead 300B' may be the same printhead in said configurations. Considering that a controller (e.g., controller 130 from FIG. 1) instructs the plurality of nozzles from the first scanning printhead 300B to eject the composition based on the mask 300A from FIG. 3A, the plurality of nozzles from the scanning printhead 300B may define two subsets. A first subset 322B from the plurality of nozzles from the scanning printhead 300B (e.g., first subset 122 from FIG. 1), comprising the nozzles between point A and point B, may be assigned to the ramp area 310A. A second subset 324B from the plurality of nozzles from the scanning printhead (e.g., second subset 124 from FIG. 1), comprising the other nozzles from the scanning printhead 300B, may be assigned to the non-ramp area 320A. Following with the example, or in a different example, considering that a controller instructs the plurality of nozzles from the second scanning printhead 300B' to eject the composition based on the mask 300A from FIG. 3A, the plurality of nozzles from the scanning printhead 300B' may define two subsets. A first subset 322B' of the plurality of nozzles from the scanning printhead 300B' (e.g., first subset 122 from FIG. 1), comprising the nozzles between point A' and point B', may be assigned to the ramp area 310A'. A second subset 324B' from the plurality of nozzles from the scanning printhead 300B' (e.g., second subset 124 from FIG. 1), comprising the other nozzles from the scanning printhead 300B', may be assigned to the non-ramp area 320A.

Figure 4A:
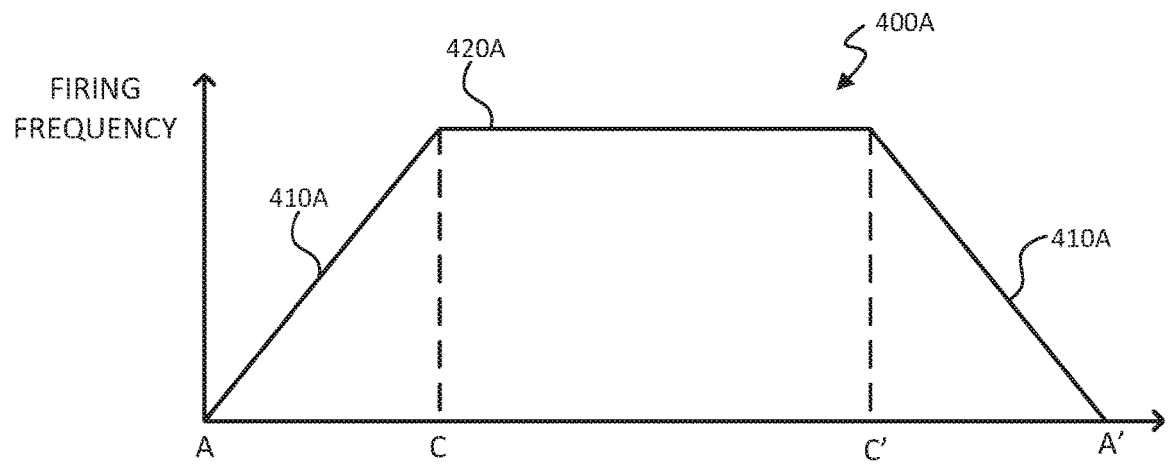
FIG. 4A is a schematic diagram illustrating another example of a mask from a print mode.

FIG. 4A is a schematic diagram illustrating another example of a mask 400A from a print mode. The mask 400A outline is defined by a different selected print mode from the selected print mode from mask 300A from FIG. 3A. The controller (e.g., controller 130 from FIG. 1) may adjust the ramp area width from the mask 400A based on a selected print mode. The mask 400A is illustrated as a graph wherein (i) the horizontal axis represents the plurality of nozzles (e.g., plurality of nozzles 120 from FIG. 1) located through the length of a scanning printhead (e.g., scanning printhead 110 from FIG. 1); and (ii) the vertical axis represents the firing frequency. The mask 400A comprises a first ramp area 410A from illustrated point A to illustrated point C. The mask 400A further comprises a non-ramp area 420A from illustrated point C to illustrated point C'. The mask 400A also comprises a second ramp area 410A' from point C' to point A'. The first ramp area 410A and the second ramp area 410A' comprise a bigger width than the first ramp area 310A and the second ramp area 310A' from mask 300A of FIG. 3A. The non-ramp area 420A comprises an equal or higher firing frequency than any point from the ramp areas 310A-310A', therefore the corresponding assigned plurality of nozzles from the ramp area 320A (e.g., second subset 124 from FIG. 1) degrade more than the corresponding assigned plurality of nozzles from the non-ramp area 310A (e.g., first subset 122 from FIG. 1).

Figure 4B:
FIG. 4B is a block diagram illustrating another example of a first subset of nozzles and a second subset of nozzles in another printhead configurations.

FIG. 4B is a block diagram illustrating another example of a first subset of nozzles and a second subset of nozzles in another printhead configurations. FIG. 4B comprises a first scanning printhead 400B located in a first edge of the width of a substrate, and a second scanning printhead 400B' located in a second edge. In an example, the first scanning printhead 400B and the second scanning printhead 400B' may be the same printhead in said configurations. In another example, the first scanning printhead 400E and the second scanning printhead 400B' may be the same as or similar to the first scanning printhead 300B and the second scanning printhead 300B' from FIG. 3B using mask 400A. Considering that a controller (e.g., controller 130 from FIG. 1) instructs the plurality of nozzles from the first scanning printhead 400B to eject the composition based on the mask 400A from FIG. 4A, the plurality of nozzles from the scanning printhead 400B may define two subsets. A first subset 422B from the plurality of nozzles from the scanning printhead 400B (e.g., first subset 122 from FIG. 1), comprising the nozzles between point A and point C, may be assigned to the ramp area 310A. Since the width of the ramp area 410A is bigger than the width of the ramp area 310A from FIG. 3A, the first subset 422B may be also bigger than the first subset 322B from FIG. 3B, and therefore may comprise a higher number of nozzles. A second subset 424B from the plurality of nozzles from the scanning printhead (e.g., second subset 124 from FIG. 1), comprising the other nozzles from the scanning printhead 400B, may be assigned to the non-ramp area 420A. Following with the example, or in a different example, considering that a controller instructs the plurality of nozzles from the second scanning printhead 400B' to eject the composition based on the mask 400A from FIG. 4A, the plurality of nozzles from the scanning printhead 400B' may define two subsets. A first subset 422B' of the plurality of nozzles from the scanning printhead 300B' (e.g., first subset 122 from FIG. 1), comprising the nozzles between point A' and point C', may be assigned to the ramp area 410A'. Since the width of the ramp area 410A' is bigger than the width of the ramp area 310A' from FIG. 3A, the first subset 422B' may be also bigger than the first subset 322B' from FIG. 3B, and therefore may comprise a higher number of nozzles. A second subset 324B' from the plurality of nozzles from the scanning printhead 300B' (e.g., second subset 124 from FIG. 1), comprising the other nozzles from the scanning printhead 300B', may be assigned to the non-ramp area 320A.

Figure 5:
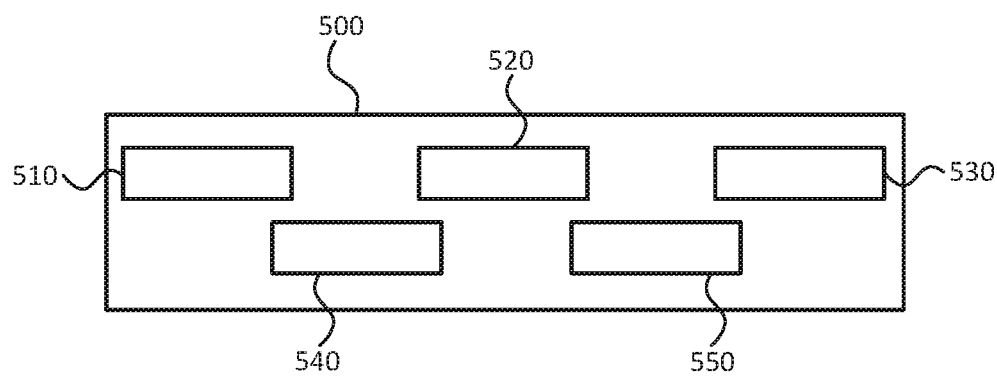
FIG. 5 is a block diagram illustrating an example of a carriage comprising a plurality of printheads.

FIG. 5 is a block diagram illustrating an example of a carriage 500 comprising a plurality of printheads. The carriage 500 comprises a first printhead 510, a second printhead 520, a third printhead 530, a fourth printhead 540, and a fifth printhead 550. For simplicity, the carriage 500 comprises five printheads 510-550, however the carriage 500 may comprise any other amount of printheads therein. Any of the printheads 510-550 may comprise a plurality of nozzles thereon (e.g., plurality of nozzles 120 from FIG. 1). The carriage 500 may be used in the printing apparatus 100 from FIG. 1, the printing apparatus 200A from FIG. 2A, the printing apparatus 200B from FIG. 2B, and/or the printing apparatus 200C from FIG. 2C replacing the scanning printhead 110, 210A, 210B, 210C respectively.

Figure 6:
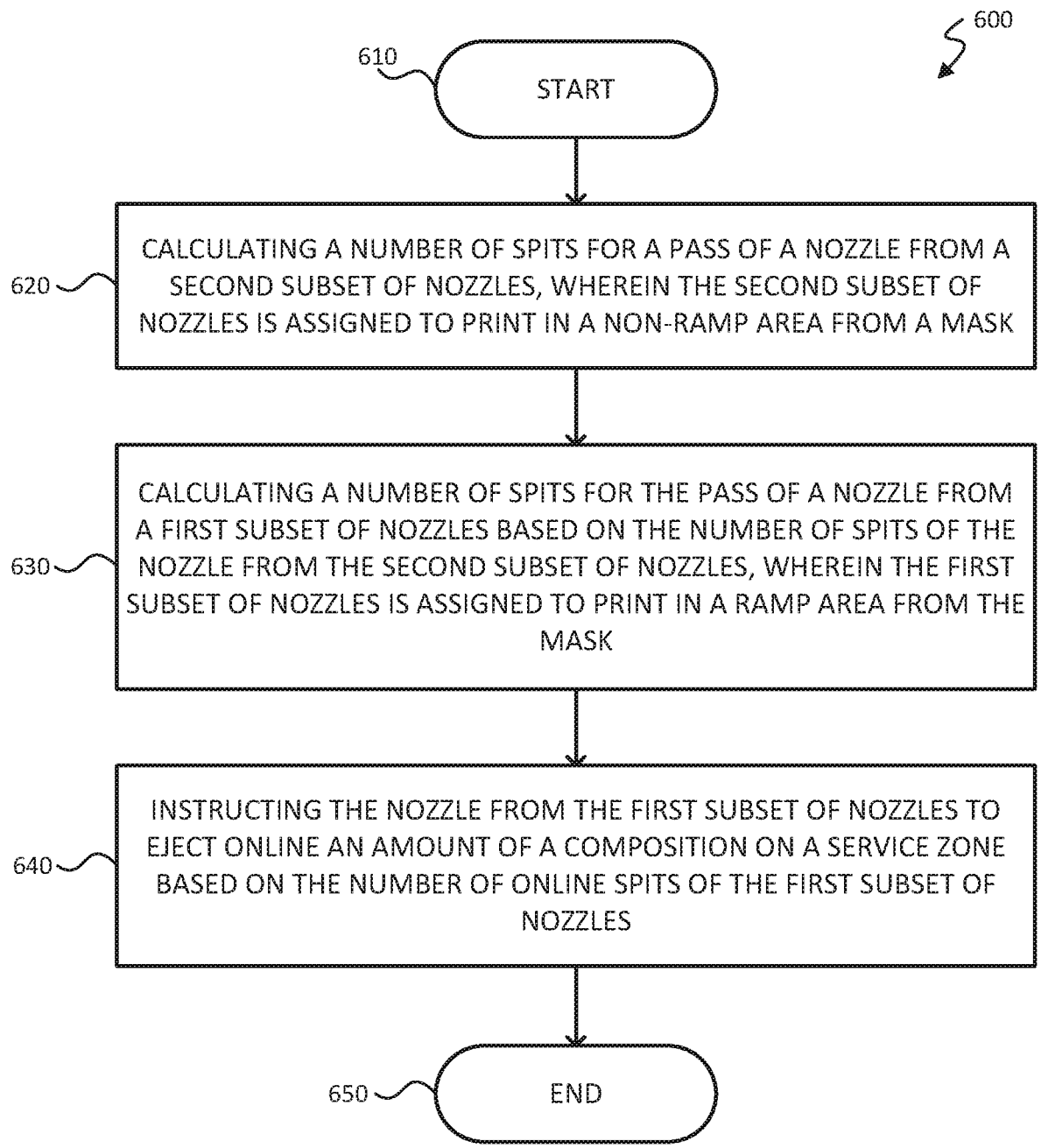
FIG. 6 is a flowchart of an example method for performing online spitting.

FIG. 6 is a flowchart of an example method 600 for performing online spitting. Method 600 may be described below as being executed or performed by a printing apparatus, such as printing apparatus 100 of FIG. 1. Various other suitable printing apparatuses may be used as well, such as printing apparatus 200A of FIG. 2A, 200B of FIG. 2B, and/or 200C of FIG. 2C. Method 600 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 600 may include more or less blocks than are shown in FIG. 6. In some implementations at least one of the blocks of method 600 may, at certain times, be performed in parallel and/or may repeat.

Method 600 may start at block 610, and continue to block 620, where a controller (e.g., controller 130 of FIG. 1) may calculate a number of spits for a pass of a nozzle from a second subset of nozzles (e.g., second subset of nozzles 124 of FIG. 1), wherein the second subset of nozzles is assigned to print in a non-ramp area (e.g., non-ramp area 320A of FIG. 3A, non-ramp area 420A of FIG. 4A) from a mask (e.g., mask 300A from FIG. 3A, mask 400A from FIG. 4A). At block 630, the controller may calculate a number of spits for the pass of a nozzle from a first subset of nozzles (e.g., first subset of nozzles 122 of FIG. 1) based on the number of spits of the nozzle from the second subset of nozzles, wherein the first subset of nozzles is assigned to print in a ramp area (e.g., ramp area 310A from FIG. 3A, ramp area 410A from FIG. 4A) from the mask. At block 640, the controller may instruct the nozzle from the first subset of nozzles to eject online an amount of a composition on a service zone (e.g., service zone 230A of FIG. 2A, service zone 230B of FIG. 2B, service zone 230C of FIG. 2C) based on the number of online spits of the first subset of nozzles. At block 650, method 600 may end. Method 600 may be repeated multiple times to print the print job, each time being printed a subsequent pass.

Method 600 may include additional blocks, for example that the controller may adjust the ramp area of the mask based on a selected print mode.

Figure 7:
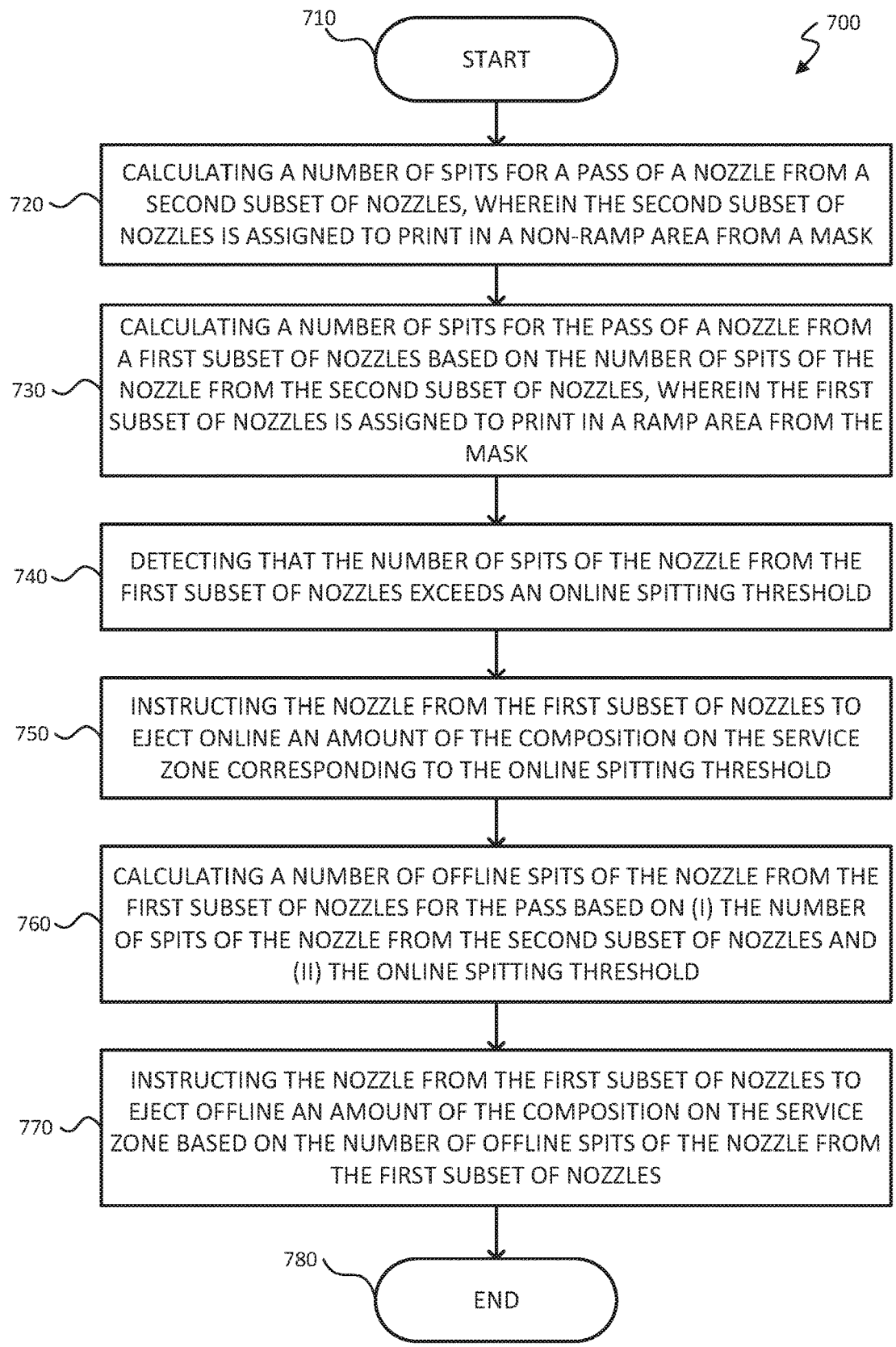
FIG. 7 is another flowchart of another example method for performing online spitting.

FIG. 7 is another flowchart of another example method 700 for performing online spitting. Method 700 may be described below as being executed or performed by a printing apparatus, such as printing apparatus 100 of FIG. 1. Various other suitable printing apparatuses may be used as well, such as printing apparatus 200A of FIG. 2A, 200B of FIG. 2B, and/or 200C of FIG. 2C. Method 700 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 700 may include more or less blocks than are shown in FIG. 7. In some implementations, at least one of the blocks of method 700 may, at certain times, be performed in parallel and/or may repeat.

Method 700 may start at block 710, and continue to block 720, where a controller (e.g., controller 130 of FIG. 1) may calculate a number of spits for a pass of a nozzle from a second subset of nozzles (e.g., second subset of nozzles 124 of FIG. 1), wherein the second subset of nozzles is assigned to print in a non-ramp area (e.g., non-ramp area 320A of FIG. 3A, non-ramp area 420A of FIG. 4A) from a mask (e.g., mask 300A from FIG. 3A, mask 400A from FIG. 4A). At block 730, the controller may calculate a number of spits for the pass of a nozzle from a first subset of nozzles (e.g., first subset of nozzles 122 of FIG. 1) based on the number of spits of the nozzle from the second subset of nozzles, wherein the first subset of nozzles is assigned to print in a ramp area (e.g., ramp area 310A from FIG. 3A, ramp area 410A from FIG. 4A) from the mask. At block 740, the controller may detect that the number of spits of the nozzle from the first subset of nozzles exceeds an online spitting threshold. At block 750, the controller instructs the nozzle from the first subset of nozzles to eject online an amount of the composition on the service zone (e.g., service zone 230A of FIG. 2A, service zone 230B of FIG. 2B, service zone 230C of FIG. 2C) corresponding to the online spitting threshold. At block 760, the controller calculates a number of offline spits of the nozzle from the first subset of nozzles for the pass based on (i) the number of spits of the nozzle from the second subset of nozzles and (ii) the online spitting threshold. At block 770, the controller instructs the nozzle from the first subset of nozzles to eject offline an amount of the composition on the service zone based on the number of offline spits of the nozzle from the first subset of nozzles. At block 780, method 700 may end. Method 700 may be repeated multiple times to print the print job, each time being printed a subsequent pass.

Figure 8:
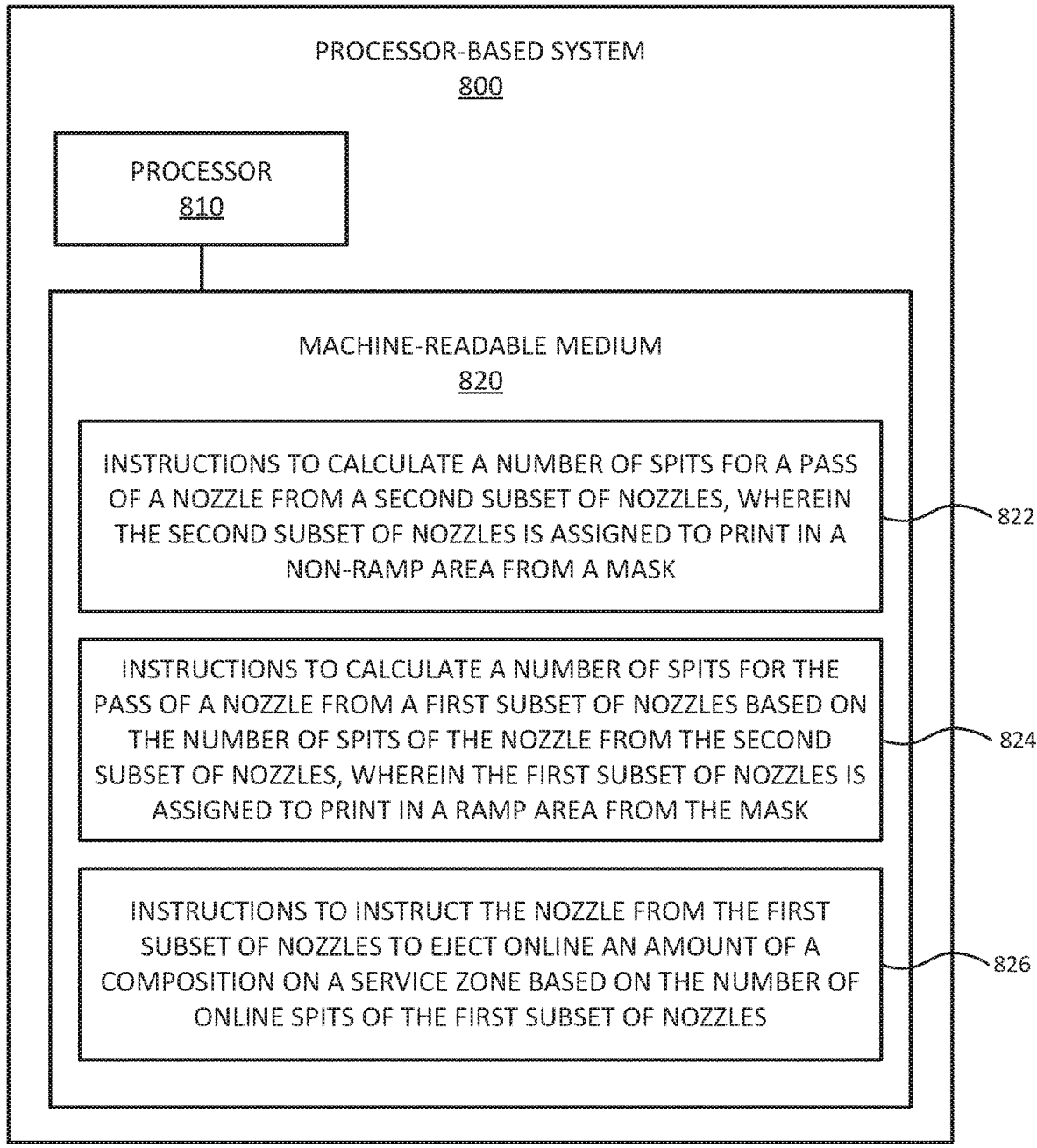
FIG. 8 is a block diagram illustrating an example of a processor-based system to perform online spitting.

FIG. 8 is a block diagram illustrating an example of a processor-based system 800 to perform online spitting. In some implementations, the system 800 may be or may form part of a printing device, such as the printing apparatus from FIG. 1. In some implementations, the system 800 is a processor-based system and may include a processor 810 coupled to a machine-readable medium 820. The processor 810 may include a single-core processor, a multi-core processor, an application-specific integrated circuit (ASIC), a field programmable gate array (FPGA), and/or any other hardware device suitable for retrieval and/or execution of instructions from the machine-readable medium 820 (e.g., instructions 822, 824, and 826) to perform functions related to various examples. Additionally, or alternatively, the processor 810 may include electronic circuitry for performing the functionality described herein, including the functionality of instructions 822, 824 and/or 826. With respect of the executable instructions represented as boxes in FIG. 8, it should be understood that part or all of the executable instructions and/or electronic circuits included within one box may, in alternative implementations, be included in a different box shown in the figures or in a different box not shown.

The machine-readable medium 820 may be any medium suitable for storing executable instructions, such as a random-access memory (RAM), electrically erasable programmable read-only memory (EEPROM), flash memory, hard disk drives, optical disks, and the like. In some example implementations, the machine-readable medium 820 may be a tangible, non-transitory medium, where the term "non-transitory" does not encompass transitory propagating signals. The machine-readable medium 820 may be disposed within the processor-based system 800, as shown in FIG. 8, in which case the executable instructions may be deemed "installed" on the system 800. Alternatively, the machine-readable medium 820 may be a portable (e.g., external) storage medium, for example, that allows system 800 to remotely execute the instructions or download the instructions from the storage medium. In this case, the executable instructions may be part of an "installation package". As described further herein below, the machine-readable medium may be encoded with a set of executable instructions 822-826.

Instructions 822, when executed by the processor 810, may cause the processor 810 to calculate a number of spits for a pass of a nozzle from a second subset of nozzles (e.g., second subset of nozzles 124 of FIG. 1), wherein the second subset of nozzles is assigned to print in a non-ramp area (e.g., non-ramp area 320A from FIG. 3A, non-ramp area 420A from FIG. 4A) from a mask (e.g., mask 300A from FIG. 3A, mask 400A from FIG. 4A). Instructions 824, when executed by the processor 810, may cause the processor 810 to calculate a number of spits for the pass of a nozzle from a first subset of nozzles (e.g., first subset of nozzles 122 from FIG. 1) based on the number of spits of the nozzle from the second subset of nozzles, wherein the first subset of nozzles is assigned to print in a ramp area (e.g., ramp area 310A from FIG. 3A, ramp area 410A from FIG. 4A) from the mask. Instructions 826, when executed by the processor 810 may cause the processor 810 to instruct the nozzle from the first subset of nozzles to eject online an amount of a composition on a service zone (e.g., service zone 230A from FIG. 2A, service zone 230B from FIG. 2B, service zone 230C from FIG. 2C) based on the number of online spits of the first subset of nozzles.

The machine-readable medium 820 may include further instructions. For example, instructions that when executed by the processor 810, may cause the processor 810 to detect that the number of spits of the nozzle from the first subset of nozzles exceeds an online spitting threshold. Instructions that when executed by the processor 810 may cause the processor 810 to instruct the nozzle from the first subset of nozzles to eject online an amount of the composition on the service zone corresponding to the online spitting threshold. Instructions that when executed by the processor 810 may cause the processor 810 to calculate a number of offline spits of the nozzle from the first subset of nozzles for the pass based on (i) the number of spits of the nozzle from the second subset of nozzles and (ii) the online spitting threshold. Instructions that when executed by the processor 810 may cause the processor 810 to instruct the nozzle from the first subset of nozzles to eject offline an amount of the composition on the service zone based on the number of offline spits of the nozzle from the first subset of nozzles.

The above examples may be implemented by hardware, or software in combination with hardware. For example, the various methods, processes and functional modules described herein may be implemented by a physical processor (the term processor is to be implemented broadly to include CPU, processing module, ASIC, logic module, or programmable gate array, etc.). The processes methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

The drawings in the examples of the present disclosure are some examples. Some examples, may include or may not include some units and functions of the procedure for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

Example implementations can be realized according to the following clauses:

Clause 1: A printing apparatus comprising a scanning printhead comprising (a) a plurality of nozzles to print using a mask comprising a ramp area and a non-ramp area wherein a first subset of nozzles of the plurality of nozzles is assigned to the ramp area and the second subset of nozzles of the plurality of nozzles is assigned to the non-ramp area; and (b) a controller to (i) calculate a number of spits of a nozzle from the second subset of nozzles for a pass, (ii) calculate a number of spits of a nozzle from the first subset of nozzles for the pass based on the number of spits of the nozzle from the second subset of nozzles and (iii) instruct the nozzle from the first subset of nozzles to eject online an amount of a composition on a service zone based on the number of spits of the first subset of nozzles.

Clause 2: The apparatus of clause 1, wherein the number of spits of the nozzle from the first subset of nozzles for the pass is further based on the distance to the non-ramp area.

Clause 3: The apparatus of any preceding clause, wherein the controller calculates the number of spits of the nozzle from the second subset of nozzles based on the fire frequency of said nozzle.

Clause 4: The apparatus of any preceding clause, wherein the fire frequency is based on a selected print mode comprising one parameter of the group defined by ink efficiency, number of passes, carriage speed, drop volume ink density, printhead nozzle resolution, color set, and/or average fire frequency per color.

Clause 5: The printing apparatus of any preceding clause, the controller further to adjust the ramp area width from the mask based on a selected print mode.

Clause 6: The printing apparatus of any preceding clause, wherein the controller comprises a spitting threshold and wherein, if the number of spits of the nozzle from the first subset of nozzles exceeds an online spitting threshold, the controller further to (a) instruct the nozzle from the first subset of nozzles to eject online an amount of the composition on the service zone corresponding to the online spitting threshold; (b) calculate a number of offline spits of the nozzle from the first subset of nozzles for the pass to be printed based on (i) the number of spits of the nozzle from the second subset of nozzles and (ii) the online spitting threshold; and (c) instruct the nozzle from the first subset of nozzles to eject offline an amount of the composition on the service zone based on the number of offline spits of the nozzle from the first subset of nozzles.

Clause 7: The printing apparatus of any preceding clause, wherein the controller calculates an accumulated number of offline spits of the nozzle from the first subset of nozzles for substantially the totality of the print job, the controller further to instruct the nozzle from the first subset of nozzles to eject offline an amount of the composition on the service zone based on the accumulated number of offline spits of the nozzle from the first subset of nozzles.

Clause 8: The printing apparatus of any preceding clause, wherein the online: spitting threshold is based on the speed of the scanning printhead and/or the width of the service zone.

Clause 9: The printing apparatus of any preceding clause, wherein the controller instructs the nozzle from the first subset of nozzles to eject the amount of the composition during a media loading.

Clause 10: The printing apparatus of any preceding clause, wherein the scanning printhead is a carriage comprising a plurality of printheads.

Clause 11: The printing apparatus of any preceding clause, wherein the composition comprises a colorant in a liquid carrier.

Clause 12: A method comprising (i) calculating a number of spits for a pass of a nozzle from a second subset of nozzles, wherein the second subset of nozzles is assigned to print in a non-ramp area from a mask; (ii) calculating a number of spits for the pass of a nozzle from a first subset of nozzles based on the number of spits of the nozzle from the second subset of nozzles, wherein the first subset of nozzles is assigned to print in a ramp area from the mask; and (iii) instructing the nozzle from the first subset of nozzles to eject online an amount of a composition on a service zone based on the number of online spits of the first subset of nozzles.

Clause 13: The method of clause 12 wherein the number of spits of the nozzle from the first subset of nozzles for the pass is further based on the distance to the non-ramp area.

Clause 14: The method of any of clauses 12 to 13, further comprising adjusting the ramp area of the mask based on a selected print mode.

Clause 15: The method of any of clauses 12 to 14, further comprising: (a) detecting that the number of spits of the nozzle from the first subset of nozzles exceeds an online spitting threshold; (b) instructing the nozzle from the first subset of nozzles to eject online an amount of the composition on the service zone corresponding to the online spitting threshold; (c) calculating a number of offline spits of the nozzle from the first subset of nozzles for the pass based on (i) the number of spits of the nozzle from the second subset of nozzles and (ii) the online spitting threshold; and (d) instructing the nozzle from the first subset of nozzles to eject offline an amount of the composition on the service zone based on the number of offline spits of the nozzle from the first subset of nozzles.

Clause 16: The method of any of clauses 12 to 15, wherein the composition comprises a colorant in a liquid carrier.

Clause 17: A non-transitory machine-readable medium storing instructions executable by a processor, the non-transitory machine-readable medium comprising: (i) instructions to calculate a number of spits for a pass of a nozzle from a second subset of nozzles, wherein the second subset of nozzles is assigned to print in a non-ramp area from a mask; (ii) instructions to calculate a number of spits for the pass of a nozzle from a first subset of nozzles based on the number of spits of the nozzle from the second subset of nozzles, wherein the first subset of nozzles is assigned to print in a ramp area from the mask; and (iii) instructions to instruct the nozzle from the first subset of nozzles to eject online an amount of a composition on a service zone based on the number of online spits of the first subset of nozzles.

Clause 18: The non-transitory machine-readable medium of clause 17, wherein the number of spits of the nozzle from the first subset of nozzles for the pass is further based on the distance to the non-ramp area.

Clause 19: The non-transitory machine-readable medium of any of the clauses 17 to 18, further comprising: (a) instructions to detect that the number of spits of the nozzle from the first subset of nozzles exceeds an online spitting threshold; (b) instructions to instruct the nozzle from the first subset of nozzles to eject online an amount of the composition on the service zone corresponding to the online spitting threshold; (c) instructions to calculate a number of offline spits of the nozzle from the first subset of nozzles for the pass based on (i) the number of spits of the nozzle from the second subset of nozzles and (ii) the online spitting threshold; and (d) instructions to instruct the nozzle from the first subset of nozzles to eject offline an amount of the composition on the service zone based on the number of offline spits of the nozzle from the first subset of nozzles.

What it is claimed is:

1. A printing apparatus comprising:
   a scanning printhead comprising a plurality of nozzles to print using a mask comprising a ramp area and a non-ramp area wherein a first subset of nozzles of the plurality of nozzles is assigned to the ramp area and the second subset of nozzles of the plurality of nozzles is assigned to the non-ramp area; and
   a controller to:
   calculate a number of spits of a nozzle from the second subset of nozzles for a pass,
   calculate a number of spits of a nozzle from the first subset of nozzles for the pass based on the number of spits of the nozzle from the second subset of nozzles, and
   instruct the nozzle from the first subset of nozzles to eject online an amount of a composition on a service zone based on the number of spits of the first subset of nozzles.

2. The apparatus of claim 1, wherein the number of spits of the nozzle from the first subset of nozzles for the pass is further based on the distance to the non-ramp area.

3. The apparatus of claim 1, wherein the controller calculates the number of spits of the nozzle from the second subset of nozzles based on the fire frequency of said nozzle.

4. The apparatus of claim 3, wherein the fire frequency is based on a selected print mode comprising one parameter of the group defined by ink efficiency, number of passes, carriage speed, drop volume, ink density, printhead nozzle resolution, color set, and/or average fire frequency per color.

5. The printing apparatus of claim 1, the controller further to adjust the ramp area width from the mask based on a selected print mode.

6. The printing apparatus of claim 1, wherein the controller comprises a spitting threshold and wherein, if the number of spits of the nozzle from the first subset of nozzles exceeds an online spitting threshold, the controller further to:
   instruct the nozzle from the first subset of nozzles to eject online an amount of the composition on the service zone corresponding to the online spitting threshold;
   calculate a number of offline spits of the nozzle from the first subset of nozzles for the pass to be printed based on (i) the number of spits of the nozzle from the second subset of nozzles and (ii) the online spitting threshold; and
   instruct the nozzle from the first subset of nozzles to eject offline an amount of the composition on the service zone based on the number of offline spits of the nozzle from the first subset of nozzles.

7. The printing apparatus of claim 6, wherein the controller calculates an accumulated number of offline spits of the nozzle from the first subset of nozzles for substantially the totality of the print job, the controller further to instruct the nozzle from the first subset of nozzles to eject offline an amount of the composition on the service zone based on the accumulated number of offline spits of the nozzle from the first subset of nozzles.

8. The printing apparatus of claim 6, wherein the online spitting threshold is based on the speed of the scanning printhead and/or the width of the service zone.

9. The printing apparatus of claim 6, wherein the controller instructs the nozzle from the first subset of nozzles to eject the amount of the composition during a media loading.

10. The printing apparatus of claim 1, wherein the scanning printhead is a carriage comprising a plurality of printheads.

11. A method comprising:
calculating a number of spits for a pass of a nozzle from a second subset of nozzles, wherein the second subset of nozzles is assigned to print in a non-ramp area from a mask;
calculating a number of spits for the pass of a nozzle from a first subset of nozzles based on the number of spits of the nozzle from the second subset of nozzles wherein the first subset of nozzles is assigned to print in a ramp area from the mask; and
instructing the nozzle from the first subset of nozzles to eject online an amount of a composition on a service zone based on the number of online spits of the first subset of nozzles.

12. The method of claim 11 further comprising adjusting the ramp area of the mask based on a selected print mode.

13. The method of claim 11 further comprising:
detecting that the number of spits of the nozzle from the first subset of nozzles exceeds an online spitting threshold;
instructing the nozzle from the first subset of nozzles to eject online an amount of the composition on the service zone corresponding to the online spitting threshold;
calculating a number of offline spits of the nozzle from the first subset of nozzles for the pass based on (i) the number of spits of the nozzle from the second subset of nozzles and (ii) the online spitting threshold; and
instructing the nozzle from the first subset of nozzles to eject offline an amount of the composition on the service zone based on the number of offline spits of the nozzle from the first subset of nozzles.

14. A non-transitory machine-readable medium storing instructions executable by a processor, the non-transitory machine-readable medium comprising:
instructions to calculate a number of spits for a pass of a nozzle from a second subset of nozzles, wherein the second subset of nozzles is assigned to print in a non-ramp area from a mask;
instructions to calculate a number of spits for the pass of a nozzle from a first subset of nozzles based on the number of spits of the nozzle from the second subset of nozzles, wherein the first subset of nozzles is assigned to print in a ramp area from the mask; and
instructions to instruct the nozzle from the first subset of nozzles to eject online an amount of a composition on a service zone based on the number of online spits of the first subset of nozzles.

15. The non-transitory machine-readable medium of claim 14 further comprising:
instructions to detect that the number of spits of the nozzle from the first subset of nozzles exceeds an online spitting threshold;
instructions to instruct the nozzle from the first subset of nozzles to eject online an amount of the composition on the service zone corresponding to the online spitting threshold;
instructions to calculate a number of offline spits of the nozzle from the first subset of nozzles for the pass based on (i) the number of spits of the nozzle from the second subset of nozzles and (ii) the online spitting threshold; and
instructions to instruct the nozzle from the first subset of nozzles to eject offline an amount of the composition on the service zone based on the number of offline spits of the nozzle from the first subset of nozzles.

* * * * *